Sept. 29, 1970          B. CHERNOFF          3,531,266
PRODUCTION OF SYNTHETIC METHANOL
Filed Jan. 31, 1968
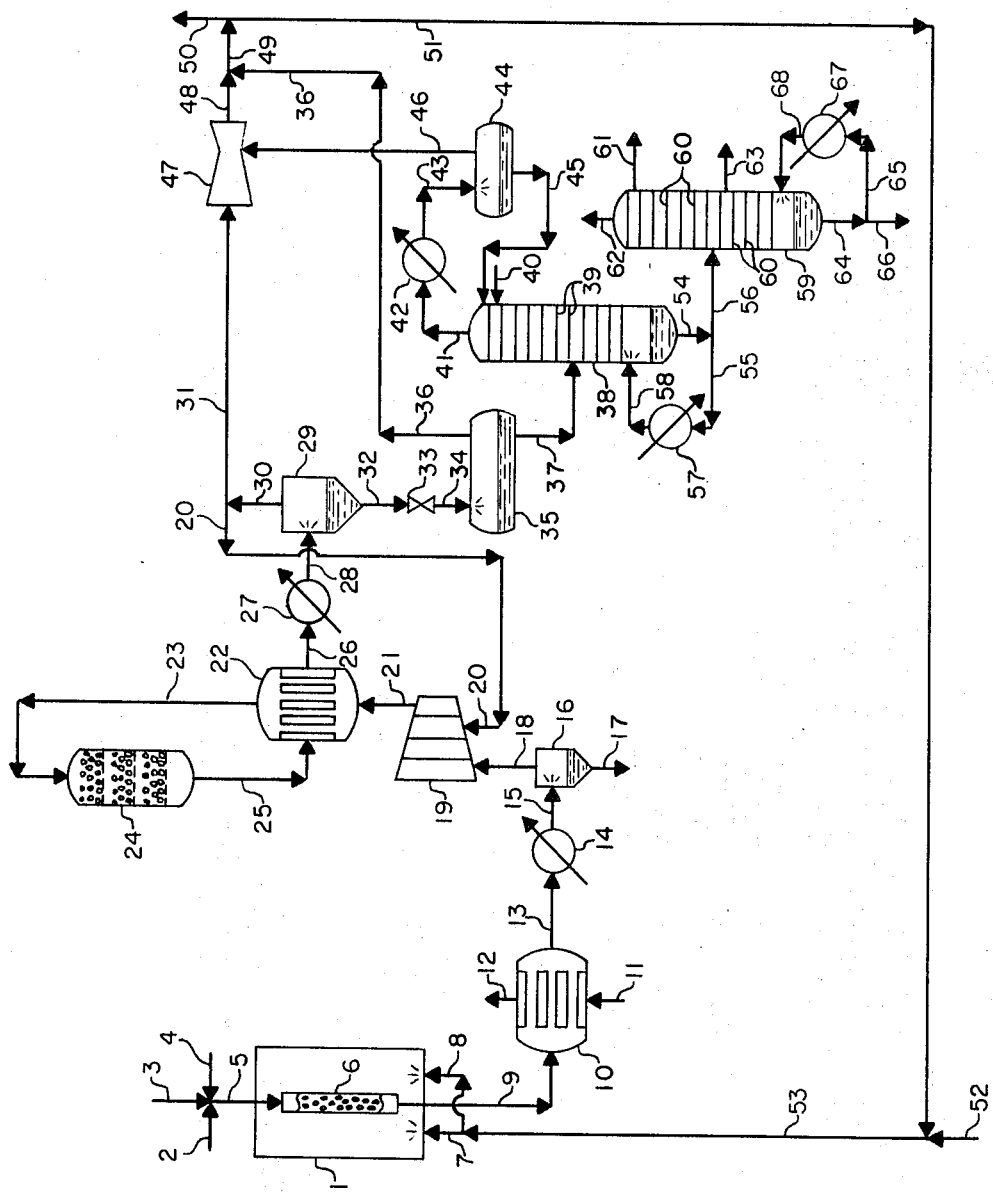
BENJAMIN CHERNOFF
INVENTOR.
BY
AGENT

United States Patent Office 3,531,266
Patented Sept. 29, 1970

3,531,266
PRODUCTION OF SYNTHETIC METHANOL
Benjamin Chernoff, Brooklyn, N.Y., assignor to Chemical Construction Corporation, New York, N.Y., a corporation of Delaware
Filed Jan. 31, 1968, Ser. No. 702,030
Int. Cl. C07c 29/16; C10l 3/00
U.S. Cl. 48—197
9 Claims

ABSTRACT OF THE DISCLOSURE

Synthetic methanol is produced by a catalytic process in which crude liquid methanol and a high pressure purge gas stream are discharged from the synthesis loop. The crude methanol is distilled at a reduced pressure to produce purified methanol, and an overhead vapor stream is discharged at low pressure from the distillation procedure. The high pressure purge gas stream is expanded to an intermediate pressure in an aspirator or jet ejector, and the low pressure overhead vapor stream from methanol distillation is inducted or aspirated into the purge gas stream in the aspirator, which discharges a mixed fuel gas at an intermediate pressure. The fuel gas is preferably employed as combustion fuel for heating the steam reformer which prepares makeup methanol synthesis gas by the catalytic steam reforming of a fluid hydrocarbon.

BACKGROUND OF THE INVENTION

Field of the invention

The invention relates to catalytic methanol synthesis processes in which synthetic methanol is prepared in the vapor state by the catalytic conversion of a portion of a mixed hydrogen-carbon oxides synthesis gas stream at elevated pressure, and crude liquid methanol condensed by cooling the converted gas stream is purified by a distillation procedure in which a low pressure overhead vapor stream is produced as a byproduct.

Description of the prior art

Synthesis gas for catalytic methanol production is generally produced by the catalytic reforming of a fluid hydrocarbon such as methane or naphtha, by processes such as described in U.S. Pat. No. 3,351,563. One type of apparatus for producing synthesis gas is described in U.S. Pats. Nos. 3,129,065 and 3,127,248. Suitable high pressure apparatus for carrying out the catalytic synthesis of methanol vapor from synthesis gas is described in U.S. Pat. No. 3,212,862. Another apparatus for this purpose is described in U.S. Pat. No. 3,366,461. The separation of crude liquid methanol from the synthesis loop is described in U.S. patent application No. 530,118, filed Feb. 25, 1966, and now abandoned. The purification of crude liquid methanol by distillation is described in U.S. Pat. No. 3,230,156.

SUMMARY OF THE INVENTION

In the present invention, the low pressure overhead vapor stream from the distillation of crude synthetic methanol is effectively recovered and utilized as a fuel gas at intermediate pressure, by inducting or aspirating the overhead vapor stream into high pressure purge gas from the methanol synthesis loop. The high pressure purge gas is expanded to intermediate pressure in an aspirator or other suitable gas expansion device such as a jet ejector, into which the overhead vapor stream is passed and pressurized, by mixing with the purge gas stream. The resulting gas mixture is suitable for usage as a fuel gas at intermediate pressure. In a preferred embodiment, the intermediate pressure fuel gas mixture is passed to the catalytic steam reformer in which the crude methanol synthesis gas is prepared by catalytic steam reforming of a fluid hydrocarbon, and the fuel gas mixture is burned to provide at least a portion of the requisite heating for the catalytic steam reformer.

The principal advantage of the invention is that overhead vapor from methanol distillation is effectively recovered and utilized as a component of an intermediate pressure fuel gas. In most of the existing methanol plants, the overhead vapor from distillation of crude synthetic methanol is vented to the atmosphere. This procedure is general practice because the pressure of the overhead vapor as liberated from the distillation reflux drum is too low for fuel gas burners in the plant complex. Thus, in prior art practice the overhead vapor is vented to atmosphere, which results in the loss of fuel values and also results in air pollution, since the overhead vapor contains various organic components such as methanol and dimethyl ether, which contribute to air pollution when the overhead vapor is vented to atmosphere.

It is an object of the present invention to provide an improvement in methanol synthesis processes.

Another object is to recover the waste overhead vapor from a crude methanol distillation column in an improved manner.

A further object is to recover the waste overhead vapor from a crude methanol distillation column at a suitable pressure for usage as a component of a fuel gas.

An additional object is to prevent air pollution by eliminating the necessity for venting of the waste overhead vapor from a crude methanol distillation column.

Still another object is to utilize the high pressure purge gas from a methanol synthesis loop to pressurize the waste overhead vapor from a crude methanol distillation column.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented, as applied to the utilization of the overhead vapor from the distillation of crude synthetic methanol as a fuel gas for the heating of a catalytic primary stream reformer in which crude methanol synthesis gas is produced.

Unit 1 is a catalytic steam reformer for the conversion of a mixture of a fluid hydrocarbon and steam to synthesis gas. Feed streams consisting of fluid hydrocarbon stream 2, steam stream 3 and carbon dioxide stream 4 are combined to form feed stream 5 which is passed to catalytic steam reforming at a pressure typically in the range of 3 kg./sq. cm. to 50 kg./sq. cm. Stream 4 may be omitted in some instances, such as when stream 2 consists of vaporized naphtha, which serves to directly provide the proper ratio of carbon oxides to hydrogen in the reformed synthesis gas. Stream 5 is passed in parallel through a plurality of catalyst-filled reformer tubes such as tube 6, which is provided with a charge of a suitable reforming catalyst such as nickel or cobalt or their oxides, deposited on a suitable carrier. Tube 6 is externally heated by the combustion of fuel gas streams 7 and 8 within unit 1. Streams 7 and 8 are partially derived in accordance with the present invention, as will appear infra.

A crude reformed synthesis gas stream 9 is discharged from tube 6 at an elevated temperature typically in the range of 800° C. to 1100° C. Stream 9 now principally contains hydrogen and carbon oxides, together with a residual steam and a minor proportion of inerts such as methane, and stream 9 has the proper ratio of hydrogen to carbon oxides for methanol synthesis gas. Stream 9 is initially cooled in process gas waste heat boiler 10, by heat exchange with condensate or boiler feed water stream 11, which is vaporized to form generated process steam stream 12. The cooled process synthesis gas stream 13 discharged from unit 10 at a temperature typically in the range of 400° C. to 600° C. is further cooled in heat exchanger 14, which may in practice consist of a series of heat exchangers and economizers which cool the synthesis gas stream by heat exchange with boiler feed or condensate water and with process streams. Final cooling of the synthesis gas stream in this case is by heat exchange with cooling water. The resulting fully cooled synthesis gas stream 15 is now at a temperature typically in the range of 30° C. to 80° C., and a pressure in the range of 2 kg./sq. cm. to 40 kg./sq. cm. Stream 15 contains a condensed liquid water phase, which is separated from the synthesis gas phase by passing stream 15 into separator 16, which is a baffled or cyclonic gas-liquid separator of conventional design. Separated liquid water stream 17 is discharged from unit 16, and stream 17 may be discharged to waste or passed to a degasifier and recycled as process condensate.

The water-free process synthesis gas stream 18 discharged from unit 16 is now suitable for usage as makeup methanol synthesis gas, and is compressed to methanol synthesis pressure in centrifugal compressor 19. A recycle synthesis gas stream 20, derived from the synthesis loop as will be described infra, is passed into the final stage or wheel of the compressor 19 for mixture with the partially compressed makeup gas stream 18 and subsequent recycle to methanol synthesis. The fully compressed synthesis gas stream 21 is discharged from unit 19 at a pressure typically in the range of 50 kg./sq. cm. to 500 kg./sq. cm. and a temperature in the range of about 30° C. to 130° C., and is now heated to a suitable temperature for catalytic methanol synthesis by heat exchange with hot catalytically reacted gas. Stream 21 is passed through gas-to-gas heat exchanger 22, and the resultant feed synthesis gas stream 23 discharged from unit 22 is now at an elevated temperature typically in the range of 250° C. to 400° C., and is suitable for passage to methanol synthesis.

Stream 23 is now passed into methanol synthesis converter 24, in which the catalytic conversion of a portion of the synthesis gas to methanol vapor takes place. A conventional catalyst for methanol synthesis, such as zinc chromite, is employed in unit 24, and the catalyst is generally provided in a plurality of beds in series, with interbed cooling being attained by the bypass injection of a portion of stream 21 into unit 24 between beds, to provide a quench of the hot gas stream between stages of catalytic conversion. A hot reacted or converted gas stream 25 is discharged from unit 24, typically at a temperature in the range of 300° C. to 450° C. Stream 25 contains methanol vapor and unreacted synthesis gas, and stream 25 is now cooled to selectively condense crude liquid synthetic methanol.

Stream 25 is initially passed through heat exchanger 22, and the resulting partially cooled gas stream 26, now at a temperature typically in the range of 150° C. to 250° C., is further cooled in heat exchanger 27, which may in practice consist of a plurality of heat exchangers in series, with initial heat exchange and cooling of the reacted gas stream taking place by indirect heat exchange with hot water or a process stream, followed by heat exchange with cooling water. The resulting process stream 28 is at a temperature typically in the range of 20° C. to 80° C. and now contains a condensed liquid phase consisting of crude synthetic methanol. Stream 28 is passed into gas-liquid separator 29, which is a conventional separator unit and may be similar in configuration to unit 16 described supra. The unreacted gas phase is removed from unit 29 via stream 30, which is divided into recycle stream 20 and purge gas stream 31. Stream 20 is recycled to methanol synthesis as described supra, and high pressure purge stream 31, which must be removed from the synthesis loop to reduce inerts concentration, is utilized in accordance with the present invention, as will appear infra. Stream 31 is generally discharge from the synthesis loop at an elevated pressure typically in the range of 50 kg./sq. cm. to 500 kg./sq. cm.

Returning to unit 29, crude liquid synthetic methanol is withdrawn via stream 32 at a highly elevated pressure, and is passed through pressure reducing valve 33 in order to reduce the pressure of the crude methanol to a level suitable for subsequent purification by distillation. The resulting crude liquid methanol stream 34 discharged by valve 33 is now at a reduced pressure typically in the range of 2 kg./sq. cm. to 12 kg./sq. cm., and stream 34 contains an evolved gaseous phase which is generated due to pressure reduction. The evolved gaseous phase principally contains synthesis gas components including hydrogen, carbon monoxide and inerts such as methane, together with methanol vapor. Stream 34 is passed into letdown tank 35, from which the evolved gaseous phase stream 36 consisting of let down purge gas is removed and utilized in accordance with the present invention, as will appear infra. Stream 36 is usually scrubbed with water to recover methanol vapor as an aqueous methanol solution in packed vent gas scrubber, not shown, prior to further utilization.

A crude liquid methanol stream 37 is also removed from unit 35, and stream 37 will generally be at a pressure typically in the range of 2 kg./sq. cm. to 12 kg./sq. cm. and a temperature typically in the range of 20° C. to 80° C. Stream 37 is now passed to any suitable distillation sequence for purification, in which an overhead vapor stream is generated and utilized in accordance with the present invention. In this preferred embodiment of the invention, stream 37 is initially subjected to a water extractive distillation procedure, in which water is employed to increase the relative volatility of impurities. Stream 37 is passed into the middle section of extractive distillation column 38, which is provided with a plurality of distillation plates or trays 39. The trays 39 may consist of valve trays, sieve trays, bubble cap plates or other vapor-liquid contact means. Water stream 50 is passed into the upper portion of column 38, and provides an aqueous solution phase through the column. An overhead vapor stream 41 is removed from the top of unit 38. Stream 41 contains methanol vapor, volatile components such as dimethyl ether, and minor proportions of other organic impurities, synthesis gas components and methane. Stream 41 is cooled and partially condensed in heat exchanger 42, and the resulting mixed gas-liquid stream 43 is passed into reflux drum 44. The liquid phase, principally consisting of methanol, is recycled from unit 44 to column 38 via stream 45 as a liquid reflux.

The residual overhead vapor phase is removed from drum 44 via stream 46 and is processed in accordance with the present invention. Stream 46 is produced at a relatively low pressure, typically in the range of 1 kg./sq. cm. to 10 kg./sq.cm., and consists of gaseous or vapor components derived from stream 41 described supra. Stream 46 is now inducted or aspirated into ejector 47, which is a suitable jet aspirator or ejector. The motive force for the aspiration of stream 46 into unit 47 is provided by expanding stream 31 through unit 47, and streams 31 and 46 combine within unit 47 to form the discharged combined gas stream 48 at intermediate pressure, generally in the range of about 3 kg./sq.cm. to 30 kg./sq.cm. The pressure of stream 48 is substantially higher than the pressure of stream 46 in all cases, which enables the utilization of stream 46 as a component of the intermediate pressure fuel gas stream 48. Stream 48 may now be utilizer per se as a fuel gas, however, in this preferred embodiment of the invention, stream 48 is combined with stream 36, to form a combined fuel gas stream 49. Stream 49 may now be partially or totally passed to external utilization as a fuel gas via stream 50, however stream 49 is preferably utilized as a fuel gas for the heating of steam reformer 1. In this case, stream 51 is combined with natural gas stream 52, and the combined fuel gas stream 53 is divided into streams 7 and 8, which are utilized as described supra.

Returning now to extractive distillation column 38, the liquid bottoms consisting of a partially purified aqueous methanol solution is removed via stream 54, which is divided into recycle stream 55 and process stream 56 which is passed to subsequent processing for the production of highly purified methanol, as will appear infra. Stream 55 is passed through heat exchanger reboiler 57, and the resulting mixed vapor-liquid stream 58 is returned into unit 38 below the lower tray section, to provide vapor and a heating effect for distillation.

Stream 56 is passed into the middle section of rectification column 59, which separates residual impurities and water from product anhydrous methanol by distillation. Column 59 is similar in configuration to column 38 described supra, and is provided with a plurality of trays 60, which may consist of bubble cap, valve or sieve trays. The methanol component of stream 56 is vaporized in column 59, and moves upwards in the column. Pure anhydrous methanol is removed via stream 61 from the upper section of the column, usually as a liquid, and overhead vapor stream 62 is removed from the top of the column. Stream 62 may be cooled and partially refluxed, with residual vapor being discharged to waste. A side stream 63 is also usually drawn off from column 59, and in some cases several lower drawoffs may be provided. Stream 63 contains methanol together with residual high boiling impurities. Stream 63 may be processed for methanol and heavy alcohols recovery, in accordance with the concepts described in U.S. patent application No. 602,388, filed Dec. 16, 1966 and issued as U.S. Pat. No. 3,406,100 on Oct. 15, 1968. An aqueous bottoms stream 64 is removed from unit 59, and divided into recycle stream 65 and excess water discharge stream 66, which may be discharged to waste or recycled to the process via stream 40. Stream 65 is heated and partially vaporized in heat exchanger reboiler 67, and the resulting mixed vapor-liquid stream 68 is recycled to the lower portion of unit 59 to provide a heating effect for rectification.

Numerous alternatives within the scope of the present invention will occur to those skilled in the art, besides those alternatives mentioned supra. The ranges of process variables such as temperature and pressure constitute a preferred embodiment for optimum utilization of the invention, and the invention may be practiced outside of these ranges in suitable instances, except that the pressure of stream 31 will always be substantially greater than the pressure of stream 46, so that an aspiration effect is obtained in the ejector 47 and stream 48 is produced at an intermediate pressure above the pressure of stream 46. Unit 19 may in some instances consist of a reciprocating compressor, in which case stream 20 would be compressed to the pressure of stream 21 in a separate gas compression unit, and subsequently combined with stream 21. Unit 24 may alternatively be provided with interbed cooling coils for cooling of the gas stream between catalyst bed stages, or other gas cooling means known to the art. In other instances, unit 24 may contain a single catalyst bed and lower integral heat exchanger, in which case the catalyst bed may be cooled by the provision of integral vertical cooling tubes through which the cold incoming synthesis gas is passed. Stream 36 may be separately employed as a fuel gas or for other purposes in some instances, in which case stream 49 would consist entirely of stream 48. In some cases, alternative distillation procedures may be adopted for the purification of the crude synthetic methanol stream 37, instead of the processing in units 38 and 59, in which case stream 46 would be derived from alternative distillation procedures. Finally, in some cases it may be desired to produce the fuel gas at a more highly elevated pressure than can be obtained by the use of a single jet aspirator. In this case, two stages of jet aspiration and compression may be provided. The high pressure purge gas stream 31 would be divided into two streams or portions. The first purge gas stream portion would be expanded through a primary jet aspirator or ejector, which would induct the distillation overhead vapor stream 46 and provide a mixed gas stream at intermediate pressure. The mixed gas stream would then be aspirated into a secondary jet aspirator, through which the second purge gas stream portion would be expanded to produce a final fuel gas stream at elevated pressure.

An example of an industrial application of the present invention will now be described.

EXAMPLE

The invention was applied to the design of a commercial 1000 tons/day synthetic methanol facility. Following in Table I are the flow rates, compositions and operating conditions for principal process streams. The reformer feed stream 5 was formed as a mixture of process natural gas, stream and carbon dioxide.

TABLE I

| | Stream No. | | | | | | | | | | | | | |
|---|---|---|---|---|---|---|---|---|---|---|---|---|---|---|
| | [1]5 | [1]9 | [1]18 | 21 | 25 | 20 | 31 | 34 | [2]36 | 37 | 46 | 51 | 52 | 61 |
| Flow rate, kg./hr. | 31,300 | 50,600 | 50,600 | 272,000 | 272,000 | 221,500 | 3,100 | 47,700 | 751 | 44,550 | 1,579 | 5,430 | 14,500 | 37,700 |
| Stream composition, mol percent: | | | | | | | | | | | | | | |
| Methane | 76.17 | 2.31 | 2.31 | 20.17 | 22.26 | 23.77 | 23.77 | 1.46 | 38.39 | 0.05 | 2.23 | 24.22 | 93.94 | |
| Ethane and higher hydrocarbons | 2.01 | | | | | | | | | | | | 2.48 | |
| Water | ([1]) | ([1]) | ([1]) | 0.03 | 1.46 | 0.02 | 0.02 | 21.17 | | 22.65 | 0.32 | 0.04 | | 0.01 |
| Carbon dioxide | 20.31 | 7.22 | 7.22 | 3.38 | 2.44 | 2.60 | 2.60 | 0.14 | 3.62 | | 0.21 | 2.57 | 1.95 | |
| Carbon monoxide | | 21.77 | 21.77 | 9.83 | 6.96 | 7.43 | 7.43 | 0.49 | 12.96 | 0.02 | 0.76 | 7.70 | | |
| Hydrogen | 0.14 | 68.28 | 68.28 | 61.75 | 56.47 | 60.45 | 60.45 | 1.70 | 44.81 | 0.05 | 2.61 | 53.92 | | |
| Nitrogen | 1.37 | 0.42 | 0.42 | 4.47 | 5.23 | 5.61 | 5.61 | 0.01 | 0.22 | | 0.01 | 4.44 | 1.63 | |
| Methanol | | | | 0.10 | 5.05 | 0.12 | 0.12 | 73.11 | | 77.23 | 25.27 | 1.98 | | 99.99 |
| Volatile components (dimethyl ether) | | | | | 0.13 | | | 1.92 | | | 68.59 | 5.13 | | |
| Stream temp., °C | 510 | 940 | 39 | 65 | 380 | 49 | 49 | 45 | 50 | 45 | 36 | 45 | 20 | 70 |
| Stream pressure, kg./sq. cm | 24.65 | 22.15 | 19.05 | 358 | 346 | 338 | 338 | 3.86 | 3.5 | 3.5 | 1.19 | 3.5 | 3.5 | 1.33 |

[1] Flow rate and composition expressed on a dry basis, following in Table II is the water content of the respective process streams.
[2] Net let down purge gas after scrubbing with water for recovery of methanol and dimethyl ether. Resulting aqueous solution is passed to crude methanol distillation section.

TABLE II

| Stream No.: | Water content, kg./hr. |
|---|---|
| 5 | 47,000 |
| 9 | 27,700 |
| 18 | 286 |

The concepts of the present invention were also designed for application to an existing 600 ton/day methanol facility. In this case, the total lower heating value of the extraction column net overhead vapor was about 19.6 million B.t.u. per hour. At 20 cents per million B.t.u. and 7200 operating hours per year, the annual fuel value of the vapor is $28,200. In this case, the maximum allowable payout time before taxes for improvement was 1.64 years. Therefore, the maximum allowable cost for installing the jet aspirator or ejector system was 1.64×$28,200 or $46,200. The total cost of the system for this facility was about $20,000, indicating the economic feasibility of the present invention.

I claim:

1. In a catalytic methanol synthesis process in which a methanol synthesis feed gas stream is passed to catalytic methanol synthesis at elevated pressure, the resulting converted gas stream containing methanol vapor is cooled to condense crude liquid methanol, said crude liquid methanol is separated from the residual gas phase at elevated pressure, said residual gas phase is divided into a high pressure purge gas stream and a recycle gas stream, said recycle gas stream is combined with makeup methanol synthesis gas to form said methanol synthesis feed gas stream, the pressure of said crude liquid methanol is reduced, and said crude liquid methanol is distilled at reduced pressure for purification, whereby an overhead vapor stream containing volatile combustible compounds derived from said crude methanol is produced at low pressure, the improved method of producing a fuel gas at intermediate pressure from methanol synthesis process gases which comprises expanding said high pressure purge gas stream to intermediate pressure in aspiration means, inducting said low pressure overhead vapor stream into said purge gas stream in said aspiration means, whereby the pressure of said overhead vapor stream is increased, and withdrawing a fuel gas at intermediate pressure from said aspiration means, said fuel gas containing combustible components derived from said purge gas stream and said overhead vapor stream.

2. The method of claim 1, in which said high pressure purge gas stream is at an initial pressure in the range of about 50 kg./sq.cm., to 500 kg./sq.cm., said low pressure overhead vapor stream is at an initial pressure in the range of about 1 kg./sq.cm. to 10 kg./sq.cm., and said fuel gas is produced at a pressure in the range of about 3 kg./sq.cm. to 30 kg./sq.cm.

3. The method of claim 1, in which a gas phase is evolved by reducing the pressure of said crude liquid methanol, and said gas phase is added to said fuel gas at intermediate pressure.

4. The method of claim 1, in which said crude liquid methanol is initially distilled at reduced pressure by water extractive distillation, and said overhead vapor stream is produced from the extractive distillation of said crude liquid methanol.

5. In a catalytic methanol synthesis process in which a fluid hydrocarbon is catalytically steam reformed to produce a gas stream for methanol synthesis in a catalytic reformer which is heated by combustion of a fuel with air, said gas stream is cooled to condense liquid water, said liquid water is separated from the cooled gas stream, said cooled gas stream is compressed, the compressed gas stream is combined with a recycle gas stream to form a methanol synthesis feed gas stream, said methanol synthesis feed gas stream is passed to catalytic methanol synthesis at elevated pressure, the resulting converted gas stream containing methanol vapor is cooled to condense a crude liquid methanol, said crude liquid methanol is separated from the residual gas phase at elevated pressure, said residual gas phase is divided into a high pressure purge gas stream and said recycle gas stream, the pressure of said crude liquid methanol is reduced, and said crude liquid methanol is distilled at reduced pressure for purification, whereby an overhead vapor stream containing volatile combustible compounds derived from said crude methanol is produced at low pressure, the improved method of heating said catalytic reformer by producing a fuel gas at intermediate pressure from methanol synthesis process gases which comprises expanding said high pressure purge gas stream to intermediate pressure in aspiration means, inducting said low pressure overhead vapor stream into said purge gas stream in said aspiration means, withdrawing a fuel gas stream at intermediate pressure from said aspiration means, said fuel gas containing combustible components derived from said purge gas stream and said overhead vapor stream, and passing at least a portion of said fuel stream to said catalytic reformer for combustion with air as a component of said fuel.

6. The method of claim 5, in which all of said fuel gas stream is passed to said catalytic reformer, together with a fluid hydrocarbon fuel, for combustion with air as said fuel.

7. The method of claim 5, in which said high pressure purge gas stream is at an initial pressure in the range of about 50 kg./sq.cm. to 500 kg./sq.cm., said low pressure overhead vapor stream is at an initial pressure in the range of about 1 kg./sq.cm. to 10 kg./sq.cm., and said fuel gas is produced at a pressure in the range of about 3 kg./sq.cm. to 30 kg./sq.cm.

8. The method of claim 5, in which a gas phase is evolved by reducing the pressure of said crude liquid methanol, and said gas phase is added to said fuel gas at intermediate pressure.

9. The method of claim 5, in which said crude liquid methanol is initially distilled at reduced pressure by water extractive distillation, and said overhead vapor stream is produced from the extractive distillation of said crude liquid methanol.

References Cited

UNITED STATES PATENTS

| 2,527,154 | 10/1950 | Scharmann | 48—197 X |
| 2,554,264 | 5/1951 | Odell | 48—197 X |
| 2,904,575 | 9/1959 | Peet | 260—449.5 |
| 2,905,731 | 9/1959 | Seed | 203—91 X |
| 2,964,551 | 12/1960 | Woolcock | 260—449.5 |
| 3,064,029 | 11/1962 | White | 260—449.5 |
| 3,214,352 | 10/1965 | Wells | 203—91 X |

JOSEPH SCOVRONEK, Primary Examiner

U.S. Cl. X.R.

23—262; 48—93, 94, 196, 213, 214; 203—92; 260—449.5